May 26, 1953          H. V. STEWART          2,639,696

TWO-CYCLE INTERNAL-COMBUSTION ENGINE

Filed March 19, 1949          2 Sheets-Sheet 1

INVENTOR
HERMAN V. STEWART

BY

*his* ATTORNEYS.

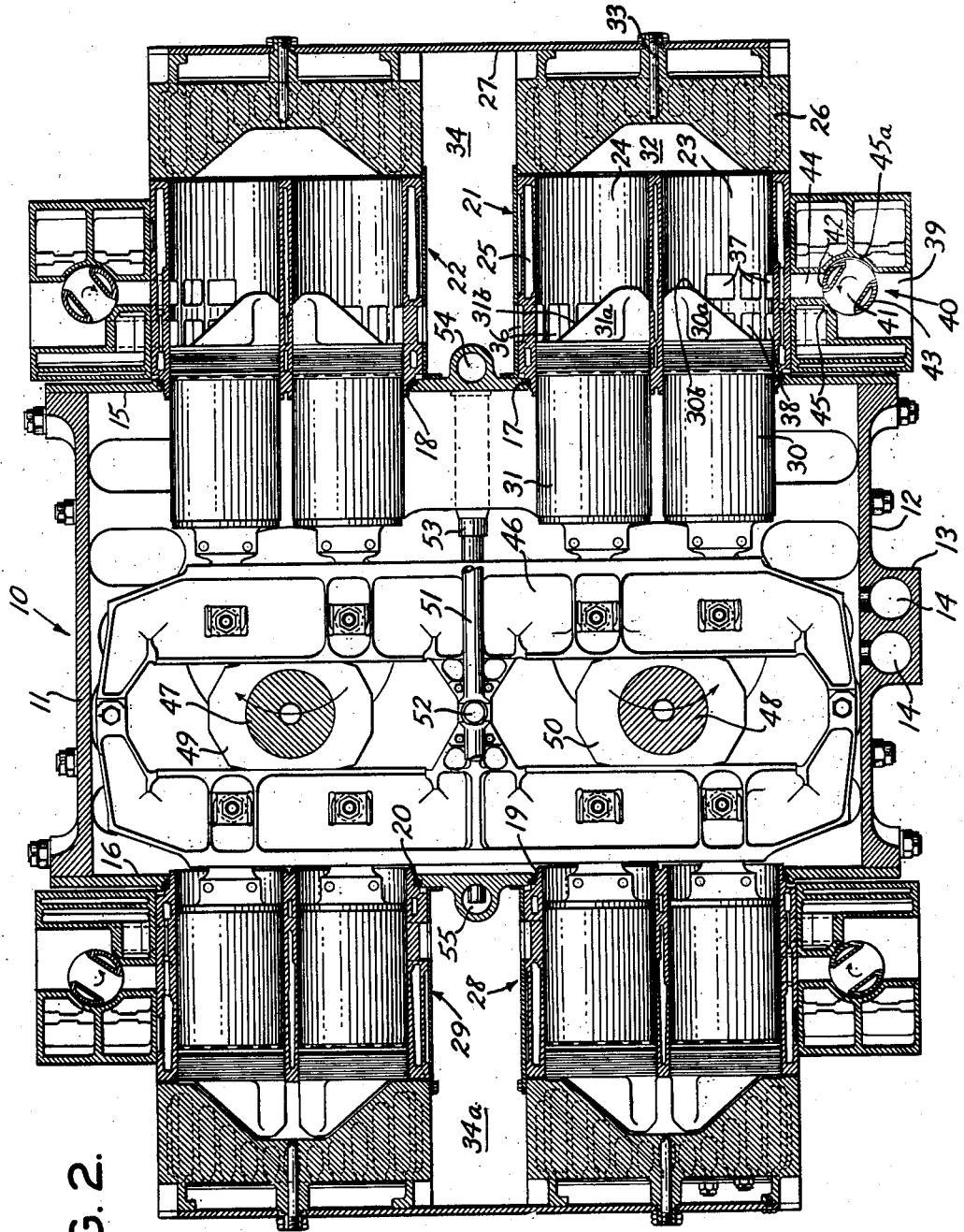

Patented May 26, 1953

2,639,696

UNITED STATES PATENT OFFICE 2,639,696

TWO-CYCLE INTERNAL-COMBUSTION ENGINE

Herman V. Stewart, Glendale, Calif.

Application March 19, 1949, Serial No. 82,408

2 Claims. (Cl. 123—53)

This invention relates to internal combustion engines and it relates particularly to improvements in two-cycle, compression ignition engines suitable for use in aircraft and other vehicles requiring a high power output, compact design and low weight per horsepower.

The production of two-cycle engines of high efficiency and high power output has many problems that are difficult to solve because of certain inherent characteristics of this type of engine. These problems are made even more difficult when the two-cycle principle is used in compression ignition engines, because of the high compression ratio required for proper ignition of the fuel charge.

One of the principal problems is to provide efficient scavenging of the exhaust gases to prevent mixing of the incoming air with such exhaust gases. It has long been recognized that the exhaust ports of a two-cycle engine should open on the combustion stroke before the intake ports open to provide a "blow down" period during which the major portion of the combustion products can escape. Conventionally, this is accomplished by locating the exhaust ports somewhat closer to the cylinder head than the corresponding intake ports on the opposite side of the cylinder. While such an arrangement is effective during the combustion stroke, it is disadvantageous on the compression stroke for it results in loss or decrease in compression. Inasmuch as the exhaust port is uncovered before the intake port is uncovered on the combustion stroke, it follows that the exhaust port is closed after the intake port closes on the compression stroke. As a result, air supplied to the cylinder is forced out of the exhaust port during the early part of the compression stroke with the result that the compression ratio of the cylinder is correspondingly reduced. This lower compression is not a vital factor in conventional spark ignition types of two-cycle engines, but it is most important in a compression ignition type of engine.

It is also highly important that the incoming air and the outgoing exhaust gases flow in the same direction along the cylinder for efficient scavenging, for the reason that it avoids mixing of the air with the exhaust gases. To this end, it has been suggested that two-cycle engines might be provided with interconnected dual cylinders having dual pistons therein which operate simultaneously so that the combustion supporting air can be supplied to one cylinder and the combustion or exhaust gases can be exhausted through a port in the other cylinder. Inasmuch as the dual pistons reciprocate together, the dual cylinders provide for the desired unidirectional flow of air and combustion gases. However, it does not solve the problem of intake and exhaust timing referred to above.

Because of the above-mentioned defect of the dual cylinder arrangement, it has been proposed to arrange the dual pistons so that the piston for controlling the exhaust port has a slight lead over the piston controlling the intake port. In this way, the exhaust port is timed to open before the intake port opens. This timing cycle is somewhat improved but it does have the defect of providing somewhat less efficient scavenging because the intake and exhaust ports are open substantially the same length of time, thereby reducing the scavenging period. Moreover, the system is not very satisfactory in high power engines because of the vibration set up by the different cycles of reciprocation of the pistons. Also, inasmuch as one of the pistons reaches top dead center before the other, the compression is not as high as might be desired, particularly in a compression ignition type of engine.

In accordance with the present invention, I have provided a two-cycle, compression ignition engine which is an effective solution to all of the above-discussed problems. My solution makes possible the production of engines with as high as 9000 hp. output, such engines nevertheless being very compact and of such weight as to make them useful for aircraft propulsion and the like.

In a typical engine embodying the present invention, the cylinders are arranged in communicating pairs or in a dual cylinder arrangement in a generally H formation. Thus, two pairs of communicating cylinders are opposed by two other pairs of cylinders, thereby providing an H cylinder bank. As many banks of these cylinders may be provided as may be desired. A typical engine may include six banks of cylinders making an apparent total of 48 cylinders. Actually, however, inasmuch as each pair of cylinders acts as a unit and each unit is provided with one fuel injection nozzle, the engine is not unusually complex. Moreover, the engine is constructed and arranged in such a way that all of the eight pistons in a bank are connected to a single yoke member for driving a pair of oppositely rotating crankshafts, thereby eliminating many of the bearings such as wrist pin and connecting rod bearings which are commonly used in dual crankshaft engines. As explained above, such a dual cylinder system has unidirectional flow characteristics for the incoming air and the outgoing exhaust gases which promotes efficient scavenging and reduces mixing of the air and the combustion products or exhaust gases to a large degree.

The principal feature of my new engine resides in the combination with the dual or paired cylinder arrangement of a novel valve construction, whereby a proper "blow down" period is obtained to provide efficient scavenging while at the same time providing the high compression ratio required for igniting the fuel by compression heat. In general, this valve construction includes a piston-controlled intake port system in one of the dual cylinders and a rotary valve controlled exhaust port system in the other cylinder. My use of a rotary exhaust valve system with the dual cylinders overcomes practically completely the above-mentioned disadvantages of a two-cycle engine. It is evident, of course, that valve ports of large area must be provided in high output engines and this rules out the conventional poppet type of valve. Rotary valves, on the other hand, permit controlled timing with practically any desired port area. The timing of the exhaust valve is of great importance, if high compression ratios and efficient scavenging are to be be obtained. The rotary valves of my engine are timed so that they open before the intake port opens, thereby providing increased "blow down" time and close at the same time as the intake ports to prevent exhaust of air in the cylinder and utilizing a greater part of the stroke of the pistons for compression of the air. In this way, when using a suitable cylinder head and piston head design, sufficiently high compression may be deveoped in the cylinders for efficient ignition of the fuel.

The above-described valve system makes unnecessary the timing of pistons to cause one of them to lead the other and thereby overcomes the vibration and twisting stresses inherent in such a design. It also permits the use of a simple yoke structure to connect all of the pistons of a bank of eight pistons, and, as explained in greater detail in my copending application Serial No. 702,899, filed October 12, 1946, it reduces crank pad pressures and vibration to an acceptable and reasonable value even in a high power output engine.

For a better understanding of the present invention, reference may be had to the accompanying drawings, in which:

Fig. 2 is a view in vertical section through one of the banks of cylinders of the engine;

Figure 1:
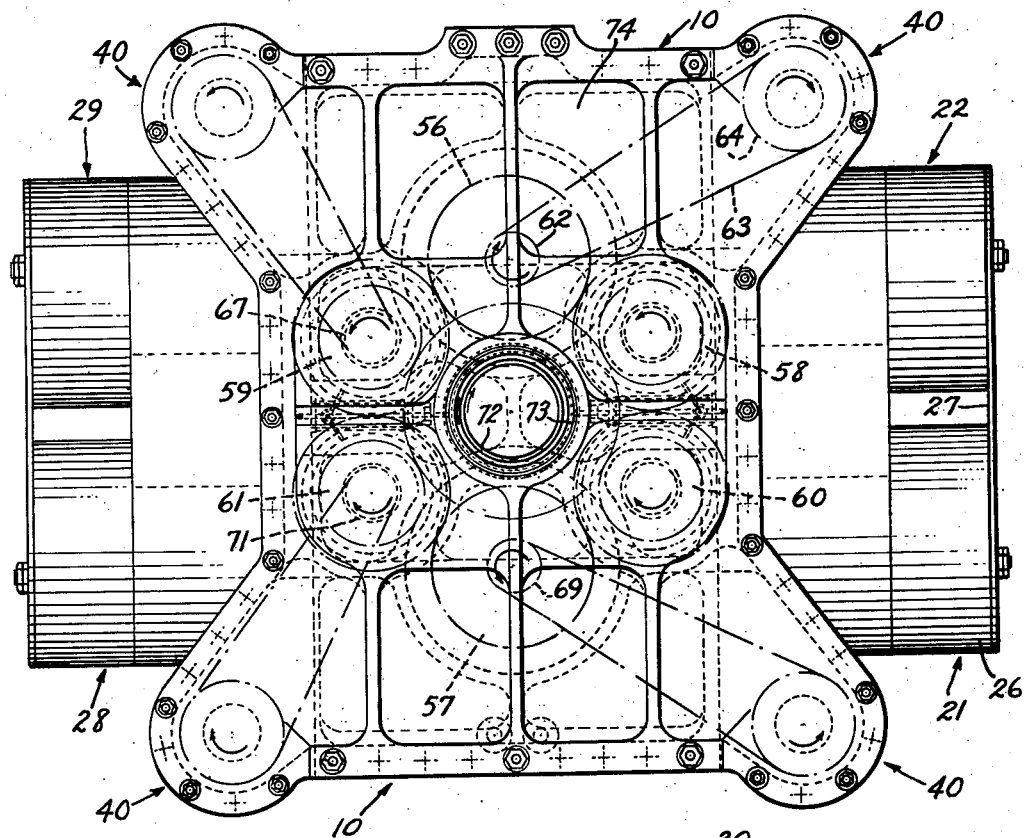
Fig. 1 is a view in end elevation of a typical form of engine embodying the present invention looking toward the propeller shaft end of the engine.

The engine chosen for purposes of illustration is a high power output engine which may be provided with a plurality of banks of cylinders which may be arranged in pancake or horizontal positions or vertical positions depending upon space requirements. The form of the engine illustrated is of the pancake type and may be used to drive one or more propellers or propeller shafts in a known way. Ony a single bank of cylinders is illustrated in the drawings but it will be understood that several banks of cylinders, for example, six, eight, or more banks, may be used, depending upon power requirements.

Referring now to Fig. 2 of the drawings, the engine includes a crankcase 10 which includes a substantially flat top plate 11 and a similar bottom plate 12 provided with a boss 13 containing the oil passages 14. The top and bottom plates are connected by means of the side plates 15 and 16 of suitable dimensions and shape which are provided with generally oval shaped pairs of apertures 17, 18, 19 and 20, respectively. The apertures 17 and 18 are adapted to receive dual cylinder elements 21 and 22 which are of generally oval configuration and adapted to fit tightly in the openings 17 and 18 where they may be secured in any suitable way. The units 21 and 22 are each provided with dual cylinders 23 and 24 of similar construction, these cylinders being surrounded by suitable coolant circulating passages 25. The cylinders 23 and 24 are provided with a cylinder head 26 common to both which is clamped to the cylinder assembly by means of studs extending from the cylinder assembly. The cylinder head is also securely clamped to crankcase cross members (not shown) by means of studs extending from the crankcase, through the member 15 and extensions thereof (not shown) between the banks of cylinders. The latter connections react combustion load from the head to the crankcase. The cylinder head 26 is also covered by a thin plate member 27 which is clamped in position by means of screws to seal the head 26 against leakage of coolant. The plate member 27 also extends across to the adjacent cylinder heads. The opposed cylinder assemblies 28 and 29 mounted in the plate 16 are similar in construction.

Figure 4:
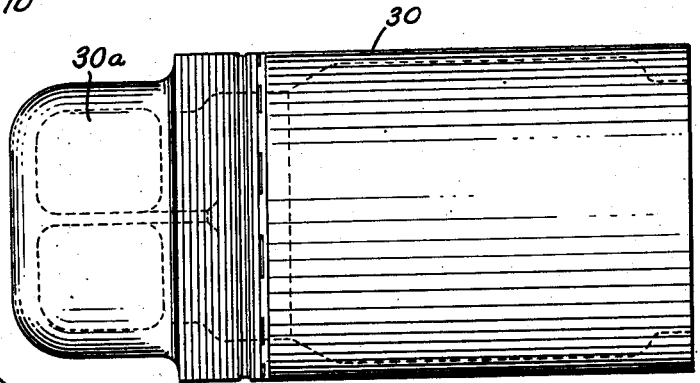
Fig. 4 is an end view of the piston showing the contours of the piston head.
Figure 3:
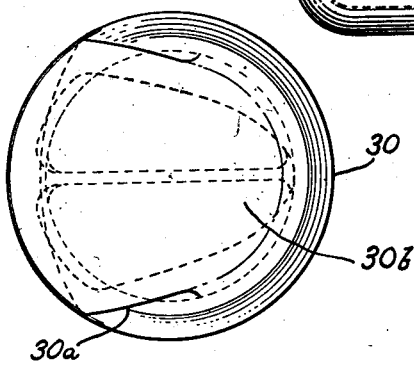
Fig. 3 is a side view of a piston of the type used in the engine.

Inasmuch as all of the cylinder assemblies and their cooperating pistons are the same, only one of them will be described hereinafter. The cylinder assembly 21 receives the dual pistons 30 and 31 mounted for reciprocation in the cylinders 23 and 24, respectively. The pistons 30 and 31, as shown in Figs. 2, 3 and 4, move domed heads 30a and 31a, respectively, which include sloping outer surfaces 30b and 31b closely fitting within the recess 32 in the cylinder head when the pistons are at the top dead center in order to provide high compression in the cylinder.

The cylinder head 26 has a bore 33 for receiving a fuel injection nozzle which directs the fuel into the space between the heads of the pistons in order to mix the fuel thoroughly with the air compressed therebetween.

The air for supporting combustion of the fuel is introduced through passageways 34, 34a extending lengthwise between the banks of cylinder units 21, 22 and 28, 29, respectively. Air may be supplied to the passages 34, 34a by means of a supercharging system including one or more stages as may be required. The supercharging system may be either engine or exhaust driven.

In order to promote efficient scavenging of the exhaust gases and at the same time to provide high compression, the cylinder units are provided with a novel intake and exhaust port timing arrangement whereby an effective "blow down" period is provided to scavenge the exhaust gases from the cylinders and avoid mixing the incoming air with the combustion products. To this end, the cylinder 24 has a series of intake ports 36 extending partially around the cylinder. These ports communicate with the air supply passage 34 and are controlled by reciprocation of the piston 31 in the cylinder 24. Thus, as the piston 31 moves from top dead center position, as shown in the cylinder unit 28, to bottom dead center, as illustrated in the cylinder unit 21, the intake ports are uncovered so that the air can be forced into the cylinder 24. The air flows from the base of the cylinder 24 up through the combustion chamber 32 and down through the cylinder 23 to the exhaust port system now to be described. The cylinder 23 has a series of exhaust ports 37 extending about half way around the cylinder and spaced nearer the cylinder head than the intake ports 36 so that the ports 37 will be uncovered by movement of the piston 30 on the combustion stroke before the ports 36 are uncovered by the piston 31. The cylinder 23 further has another series of exhaust ports 38 near the base thereof which are piston controlled. The gases can escape through the ports 38 into the exhaust manifold 39 without restriction other than that imposed by the size of the ports 38.

The above-described port arrangement would not be very efficient for a compression-ignition type of engine for the reason that air could continue to escape from the ports 37 after the intake ports 36 were closed by movement of the piston toward top dead center. In order to avoid loss of compression and at the same time to permit an extended "blow down" period, I have provided a rotary valve member 40 for controlling the timing of the ports 37. The rotary valve member 40 includes a generally cylindrical member which extends lengthwise of the several banks of cylinders, and includes a transverse internal slot 41 through which the gases can escape. The outer arcuate portions 42 and 43 of the valve on opposite sides of the slot 41 are wide enough to close the passage 44 in the manifold communicating with the ports 37 and to rotate in the guide surfaces 45 and 45a in the exhaust manifold to effect a relatively tight seal therewith during rotation of the valve. If desired, the arcuate portions 42 and 43 of the rotary valve member 40 may be liquid cooled to keep down the valve temperature. The valve member 40 may be supported and guided in suitable bearings between the banks of cylinders and at its ends.

It will be understood that in an engine having several banks of cylinders, rotary members 40 extend lengthwise of the engine and include a passage 41 corresponding to each cylinder assembly with which it is associated. The passages 41 in the elongated rotary member will be angularly related so as to conform to the timing of the several banks of cylinders.

The valve 40 is rotated in such timed relation that it is substantially fully open as the piston 30 uncovers the ports 37 on the combustion stroke so the exhaust gases can escape through them. Inasmuch as the valve is continuously rotated, it can be timed so that it closes just as the piston closes the intake ports 36 on the compression stroke. Inasmuch, also, as the pistons 30 and 31 travel together, as will be explained hereinafter, the additional exhaust ports 38 may be designed to open and close simultaneously with, or somewhat after and before, respectively, the opening and closing of the intake ports 36. This may be accomplished simply by adjusting the axial location of the space between the ports 37 and 38 together with the consequent required size of the rotary valve. It will be understood that the timing of the rotary valve can be modified, if desired, so that it closes before the exhaust ports 38 and the intake ports 36 are closed by movement of the pistons 30 and 31. Either way, a prolonged exhaust period is obtained so that scavenging of the exhaust gases is improved without loss of compression or substantial mixing of the air and exhaust gases.

As indicated above, each of the cylinder units 21, 22, 28 and 29 acts as a unit and in order to simplify the engine structure and reduce its complexity, the cylinder units 21 and 22 operate together as do the cylinder units 28 and 29. The various pistons in these cylinders are connected by stiff connecting rods to a yoke member 46 of the type described in my copending application Serial No. 702,899, the yoke being utilized to drive a pair of counter rotating crankshafts 47 and 48 which are supported in bearings in the crankcase 10. Bearing blocks 49 and 50 are interposed between the yoke 46 and the crankshafts 47 and 48 to transfer resultant yoke loads to the crankshafts.

It will be understood that the engine is provided with lubricating means and that the yoke may be guided within the crankcase. For example, the yoke 46 may be provided with a tubular guide rod 51 connected pivotally to a hollow stud 52 at the center of the yoke and guided at its opposite ends in sleeve 53 carried by cross members of the crankcase (not shown). The hollow tube 51 may be utilized as an oil passage communicating with the oil passages 54 and 55 so as to supply cooling and/or lubricant to the pistons and cylinders through passages in the yoke body and pistons. The surfaces of the blocks 49 and 50 bearing against the yoke, along the crankshaft bearings, may be lubricated by means of oil passages in the crankshaft as explained in application Serial No. 702,899.

The rotary valves 40 are driven by means of the crankshafts 47 and 48, as best shown in Fig. 1 of the drawing. The crankshafts are provided with gears 56 and 57 which mesh with and drive a series of four gears 58, 59, 60 and 61, the gears 58 and 60 meshing with each other as do the gears 59 and 61 so that the crankshafts 47 and 48 are geared together for counterrotation. The rotary valve 40, for the cylinder unit 22, for example, may be driven from the crankshaft 47 by means of the sprocket 62 connected to the crankshaft, a chain 63 and a timing gear 64 on the end of the rotary valve. Similarly, the valve 40 for the cylinder unit 29 may be driven by means of a sprocket 67 connected to the gear 59.

The rotary valve 40 for the cylinder unit 21 is driven by a sprocket 69 turning with the crankshaft 48 while the remaining rotary valve unit 40 for the cylinder unit 28 is driven by a sprocket 71 rotating with the gear 61. The several gears referred to above may be connected to a single propeller shaft, or, as illustrated, to dual concentric propeller shafts 72 and 73 in any desired way. The gearing described above and the chain drives may be protected by means of an end cover plate 74 of appropriate shape and design which may be reinforced with flanges or ribs to support the propeller shafts 72 and 73.

From the preceding description, it will be apparent that the cylinder units, for example, units 21 and 22, operate together while the cylinder units 28 and 29 also act together but in opposition to the cylinder units 21 and 22. In effect, the cylinder units 21 and 22 on one side of the engine act as a single cylinder as do the cylinders 28 and 29 on the opposite side so that the combustion of fuel in one set of cylinders forces the pistons of the other units toward top dead center to compress the gases for firing when the pistons just about reach top dead center position.

The above-described arrangement of cylinder units and a connecting yoke for driving intergeared counterrotating crankshafts enables the engine to develop very high power without creating vibrations, pressures and the like in the engine greater than the bearing structures are capable of withstanding. Also, the valve timing system described above is such as to promote more efficient operation of the engine than was possible with the prior types of two-cycle engines so that the fuel is utilized more efficiently.

While the system described is primarily intended to be used in high power output engines, it will be understood that it can be used with equal facility and with great efficiency in small engines of relatively low power output. Therefore, the form of the invention described herein should be considered as illustrative and not as limiting the scope of the following claims.

I claim:

1. A two-cycle internal combustion engine comprising two spaced apart cylinder assemblies in side-by-side relation, each cylinder assembly including a pair of parallel cylinders and a cylinder head common to both cylinders and connecting them, a plate member extending between the heads of the cylinder assemblies and forming with the assemblies a passage between said assemblies, means in said cylinder heads to introduce fuel into the cylinders of said assemblies for combustion therein, pistons reciprocable in said cylinders, means connecting all of said pistons for simultaneous reciprocation, intake ports connecting one cylinder of each assembly with said passage, exhaust ports in the other cylinders of said assemblies, all of said ports being covered and uncovered by reciprocation of said pistons, said exhaust port being nearer the cylinder head than the intake port and uncovered and covered by the piston in its corresponding cylinder before and after, respectively, the corresponding intake port is uncovered and covered, a passage for exhaust gases communicating with each exhaust port, a rotary valve member in each passage opening and closing said passage to control escape of exhaust gases through said passage, said valve member having a diametrically extending passage therethrough, and means responsive to reciprocation of said piston for rotating said valve to open the passage before the intake port is uncovered and to close the passage at about the same time the intake passage is covered.

2. A two-cycle internal combustion engine comprising a plurality of banks of cylinder assemblies, each bank including a pair of cylinder assemblies having a space between the cylinder assemblies, the assemblies being aligned in two parallel rows, a member extending between the cylinder assemblies lengthwise of and between said rows and connecting said spaces to form a passage, each assembly comprising a pair of substantially parallel cylinders having cylinder walls arranged in side-by-side relation, all of the cylinders in the bank having their axis in a common plane, a cylinder head common to and connecting the cylinders of each cylinder assembly for communication therebetween, and intake port adjacent to and extending through the wall of each cylinder adjacent to said passage and connecting the passage to the cylinders, pistons reciprocable in said cylinders, means connecting all of the pistons of each bank of cylinder assemblies for reciprocation in unison, an exhaust port extending through the wall of the other cylinder of each cylinder assembly nearer the cylinder head than the intake port, said intake and exhaust ports being uncovered and covered by the pistons in the respective cylinders, the exhaust ports of each assembly being uncovered and covered before and after, respectively, the intake port of the assembly is uncovered and covered, a separate passage for exhaust gases communicating with each exhaust port, a rotary valve member in each passage having a diametrical exhaust opening therethrough, said valve member being mounted in said passage for opening and closing said passage to control escape of exhaust gases through said passage, means responsive to rotation of the pistons of each cylinder assembly for rotating the valve of the cylinder assembly to open the passage before the intake port is uncovered and to close the passage at about the same time the intake passage is covered.

HERMAN V. STEWART.

References Cited in the file of this patent

UNITED STATES PATENTS

| Number | Name | Date |
|---|---|---|
| 874,200 | Hoyt | Dec. 17, 1907 |
| 990,974 | Giles | May 2, 1911 |
| 1,358,954 | Holmstrom | Nov. 16, 1920 |
| 1,457,322 | Sproule | June 5, 1923 |
| 1,514,476 | Still | Nov. 4, 1924 |
| 1,595,607 | Jones | Aug. 10, 1926 |
| 2,188,630 | Grahman | Jan. 30, 1940 |
| 2,234,918 | Linthwaite | Mar. 11, 1941 |
| 2,425,156 | Knight | Aug. 5, 1947 |

FOREIGN PATENTS

| Number | Country | Date |
|---|---|---|
| 416,630 | Germany | July 7, 1925 |
| 627,780 | France | Oct. 12, 1927 |